Sept. 5, 1939.  F. A. HELFRECHT  2,172,280
FLUID SEAL
Filed Aug. 1, 1938
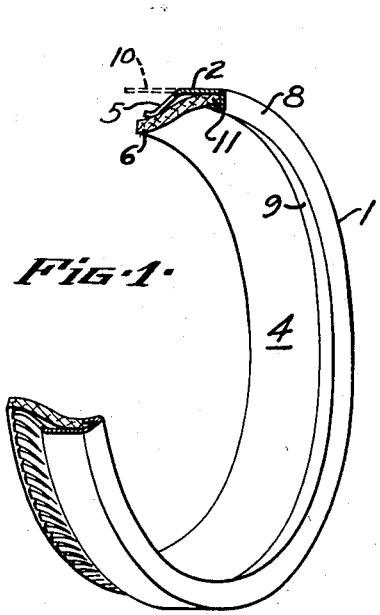
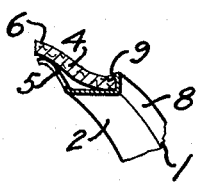
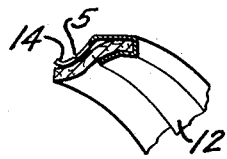
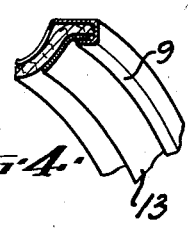
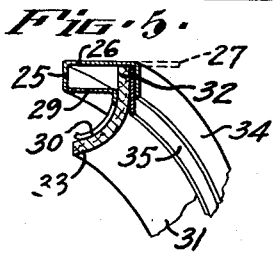
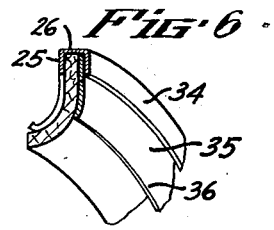
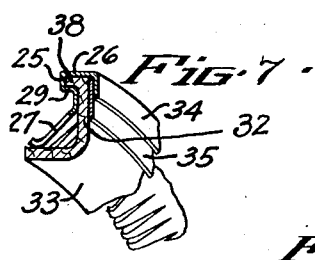
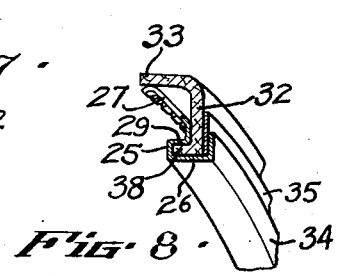
INVENTOR.
FRED A. HELFRECHT
BY A. Dunham Owen
ATTORNEY.

Patented Sept. 5, 1939

2,172,280

UNITED STATES PATENT OFFICE 2,172,280

FLUID SEAL

Fred A. Helfrecht, Oakland, Calif., assignor to National Oil Seal Co., Oakland, Calif., a corporation of Nevada Application August 1, 1938, Serial No. 222,326

6 Claims. (Cl. 288—3)

My invention relates to sealing devices, and particularly to seals for use with rotating or reciprocating cylindrical shafts.

The problems encountered in retaining lubricants or other substances within a closed space from which a working member extends have resulted in the design of many forms of seals. These conventionally include a housing and a flexible sealing member, together with means for securing the sealing member to the housing, and means for holding the sealing member in contact with the surface to be sealed. Pressure must be exerted sufficient to maintain the sealing contact, yet not so great as to introduce serious frictional losses or cause scoring of the shaft. The sealing lip must be capable of instantly accommodating eccentricities in the shaft movement, and yet the whole structure must be designed to resist both axial and rotational stresses.

The seals designed to meet these conditions have in many cases been difficult to make and install, as well as requiring a number of parts and expensive machinery to form and assemble them. One assembly problem, for example, lies in holding whatever resilient means are used to position the sealing lip out of the way while the sealing washer is inserted in its housing. A subsequent difficulty occurs in holding the resilient means in place during application of the device.

The wide variation in spacing between housings and surfaces to be sealed complicates the manufacturer's supply problem, and the resultant large number of stock sizes which must be carried is economically wasteful.

These objections, as well as others, have been overcome by the invention to be described below, in which I combine a one-piece housing with spring fingers into a unitary member acting both to hold a sealing member securely, and to press the sealing lip into proper engagement with the surface to be sealed. This structure keeps the sealing member and the spring fingers in proper unitary relation at all times, readily resists torque and thrust, and simplifies the problems of both manufacture and installation.

Among the objects of my invention are: to provide a sealing device having the least possible number of parts; to provide a one-piece case which supports a flexible member in sealing relation against a desired surface; to provide a seal in which the flexible member may be substantially cylindrical; to provide a seal in which there is a minimum of radial separation between the free and secured ends of the flexible member; to provide a seal which is simply made and applied; to provide a form of seal in which there is no interference with the insertion of the flexible member by the resilient positioning means; to provide a seal in which the resilient lip positioning means do not interfere with insertion of the seal in the proper place; to provide a seal which can be made in a comparatively few standard sizes and readily adapted for widely variant housings; to provide a seal readily resisting thrust and rotational stress; to provide a one-piece cage and spring member; to provide a unitary housing and spring construction which permits proper tempering of the spring elements; to provide a unitary structure in which integrally formed springs are positioned about a sealing member after the proper positioning of the latter; to provide a seal structure wherein the resilient member will not press into and lock with the flexible sealing member; to provide a resilient pressure member with a limited inward movement; and to provide such a unitary seal in a form which can be quickly and easily made and applied with a minimum of expense.

The invention possesses other objects and features of advantage, some of which, with the foregoing, will be set forth in the following description of the preferred forms of my invention which are illustrated in the drawing accompanying and forming a part of the specification. It is to be understood that I do not limit myself to the showing made by the drawing and descriptions as I may adapt a variation of the preferred forms within the scope of my invention as set forth in the claims.

Fig. 1 is a fragmentary perspective view of one of my unitary seals arranged for "inside" use and having a barrel type sealing washer;

Fig. 2 is a fragmentary sectional view of a seal similar to that shown in Fig. 1 but arranged for "outside" use;

Fig. 3 shows a modification of the device shown in Fig. 1;

Fig. 4 illustrates a different modification of Fig. 1;

Fig. 5 shows my invention applied to flange type sealing washers;

Fig. 6 is a modification of the type shown in Fig. 5;

Fig. 7 is a further modification of Fig. 5 arranged for "inside" sealing;

Fig. 8 is a form similar to that shown in Fig. 7 but arranged for "outside" sealing.

I have illustrated the simplest embodiment of my invention in Fig. 1, wherein a one-piece annular frame 1 having a substantially cylindrical peripheral surface 2 holds a sealing member 4. The cylindrical surface 2 is force-fitted or pressed into a housing bore, not shown in the figure, while resilient fingers 5, extending from frame 1, hold the sealing lip 6 of member 4 in contact with a sealed surface, also not shown.

When the seal is to have only a small radial separation between the sealing lip 6 and the clamped end 11, the member 4 will be nearly cylindrical, and might conveniently be formed from tubular material. If the radial separation is considerable, the sealing member 4 may be frusto-conical in shape, or may be molded in approximately the shape shown in the figure.

In making the assembly, a groove is formed by turning flanges 8 and 9 inwardly from the cylindrical surface 2, and a plurality of fingers 5 are cut while in the position indicated by dotted line 10. The sealing member 4 is then placed so that its end 11 opposite sealing lip 6 may be securely and tightly clamped by a spinning operation or by a die which forces flange 9 outwardly to compress end 11 into keystone form.

Next, fingers 5 are bent into position by a suitable forming member. In the position shown, the fingers should bear on the washer with sufficient force to maintain a tight seal, without such undue pressure as to cause great frictional loss or scoring of the shaft or moving member.

The process for making the embodiment of Fig. 2 is identical except that the sealing member is arranged for outward pressure, and hence the flange 8 and fingers 5 are bent outwardly instead of inwardly. In Fig. 2 the cylindrical surface 2 is force-fitted about a shaft or other member, while in Fig. 1 it is pressed into a bore or housing, forming a fluid-tight fit in both cases. In both, the resilient fingers 5 press the sealing lip 6 against the "surface to be sealed", which phrase will be used throughout this specification to designate the surface with which the sealing lip is in contact.

From the constructions thus far described it will be seen that the complete sealing member may comprise only two pieces of material, a flexible sealing member which may be leather, synthetic materials, rubber-like materials, or any other material having suitable qualities of resiliency, non-porosity, lack of abrasiveness, and sufficient ruggedness to stand the sealing pressures and the torque transmitted from the shaft, and a one-piece case and spring unit in which it is mounted.

In Fig. 3, I have shown a modification of the fundamental design of Fig. 1 which is particularly suited to use in sealing higher pressures and in places where the radial separation between shaft and housing is considerable. When very high pressures are used, I find it desirable to extend the flange 8 to form a backing flange 12, which reinforces the sealing member 4 and keeps it in the proper position. The backing flange 12 is also useful in guiding sealing member 4 into proper position for clamping during assembly.

In most cases it is desirable to bend back the free ends 14 of flanges 8, during the forming operation, so that the ends 14 will not dig into the washer and lock therewith.

When the radial separation between shaft and housing is considerable, it becomes difficult to form a backing flange of the type shown in Fig. 3 of sufficient width. In such cases, it is possible to use a separately formed backing flange 13, as shown in Fig. 4. The wide backing flange portion is inserted with the sealing member during assembly, so that the single operation of spinning over flange 9 secures them both. In this construction, I still retain the feature of the outer cage and the spring fingers being made from one piece of material.

The embodiments above utilize axially extending sealing members. In some applications it is desirable to use a "flange type" sealing member. In the latter case the clamped edge of the sealing member is usually held in a position normal, rather than parallel, to the sealed surface.

I have been able to apply the principle of using a one-piece housing and spring member to use with the "flange type" of sealing washer, as shown in Figs. 5 to 8.

In Fig. 5, I have shown an internal seal, although it will be obvious that the elements may be reversed to form an outer type seal. In manufacture, a one-piece annular cage is formed with a radial wall 25 having an outer cylindrical bore engaging wall 26 having a free edge extending as indicated by dotted line 27, and an inner annular generally axially extending wall 29. Fingers 30 are cut in the bent back portion formed at the inner extremity of said inner wall 29, bent radially inward, and formed as shown in the drawing so that the full length of the bent back portion 30 lies axially beyond (to the left in Fig. 5) the inner extremity of 29 where it joins 30. They may then be hardened and tempered to the desired resiliency. A formed sealing member 31 having a radial clamping portion 32 and an axial sealing lip 33 is then placed in position, and free edge 27 is spun down forming a flange 34 to clamp seal 31 tightly in place. When there is a substantial radial separation between the sealed surface and the wall 26, it is desirable to place an annular backing washer 35 over the radial portion 32 of the seal before spinning down the edge 27. Flange 34 should extend inwardly slightly beyond inner wall 29 to insure proper clamping of the sealing member in the cage.

Where the space for the seal is very limited, I may eliminate the annular portion of the cage as shown in Fig. 6, retaining only the radial wall 25, the outer cylindrical wall 26, and the flange 34. In this figure the annular backing washer 35 has been widened, and the inner portion 36 is dished somewhat to follow the curve of the sealing member and provide additional axial support.

Figs. 7 and 8 show internal and external type seals which are modifications of Fig. 5, wherein the radial portion 32 of the sealing member may be bent back to form an axially extending edge 38, extending into the space between annular walls 26 and 29. When flange 34 is spun down over washer 35, there is an additional clamping action between the axially extending edge 38 and the radial wall 25. The washer may be clamped tightly on both the axial and radial portions, or either, depending somewhat on the particular characteristics of the fluid to be retained by the seal. I have shown the fingers 27 shaped to press against the sealing lip portion 33 only of the sealing member, instead of following the contour of the member closely as in Figs. 5 and 6.

I do not wish to be limited to cylindrical shafts and housings, as my invention may be applied to combinations of housings and working members having other cross-sectional shapes.

From the exposition above, it may be seen that my invention makes possible the application of an extremely simple seal construction to a wide variety of uses. The seals described answer fully the requirements for maintaining tight closures about various types of rotating and reciprocating members operating into and out of housings carrying liquid, semi-liquid, or gaseous substances under pressure, and may also be used where the parts are stationary. They can be easily and cheaply made, and avoid most of the difficulties experienced in assembling and installing the previously known types of seals. The means for maintaining the sealing lip in contact with the sealed surface are integral with the housing, and yet do not interfere with assembly and can be heat treated to the required degree before assembly without injury to the flexible sealing member. In some instances, metals are available which require no heat treating and possess the necessary resiliency to give the spring action and at the same time are soft enough to make a good press fit in a housing.

Various modifications in materials and in the arrangement of the elements can be made without departing from the spirit of my invention, and I deem such modifications to be within the scope of the appended claims.

What I claim is:

1. A cage member for use in a unitary sealing device of the type employing a flexible sealing member, comprising in one integral stamping a cylindrical portion having a peripheral surface for leak-tight fit with one of the surfaces being sealed, an annular series of spring fingers carried by said portion adjacent one of its edges and at an oblique angle thereto and extending laterally beyond the plane of attachment thereto on the side toward which they point, and an extended portion on the other edge of said peripheral portion adapted to be formed into a flange to clamp a sealing member against an opposite internal face of said cage.

2. A self-contained unit for closing the aperture between a housing and a shaft projecting therethrough, comprising a flexible sealing member extending generally between said shaft and said housing, and a one-piece cage member formed from a stamping having a cylindrical portion having a peripheral surface for leak-tight fit with one of the surfaces being sealed, an annular series of spring fingers carried by said portion adjacent one of its edges and at an oblique angle thereto and extending laterally beyond the plane of attachment thereto on the side toward which they point, and an extended portion on the other edge of said peripheral portion formed into a flange to positively grip one edge of said sealing member against an opposite internal face of said cage.

3. A self-contained unit for closing the aperture between a housing and a shaft projecting therethrough, comprising a flexible sealing member extending generally between said shaft and said housing, a one-piece cage member formed from a stamping having a cylindrical portion having a peripheral surface for leak-tight fit with one of the surfaces being sealed, an annular series of spring fingers carried by said portion adjacent one of its edges and at an oblique angle thereto and extending laterally beyond the plane of attachment thereto on the side toward which they point, and an extended portion on the other edge of said peripheral portion formed into a flange to positively grip one edge of said sealing member against an opposite internal face of said cage, and a cage closure member overlying a portion of the body of said sealing member and clamped thereagainst by the aforesaid flange.

4. A unitary seal for closing the aperture between a housing and a shaft projecting therethrough, comprising a flexible sealing member having a clamping portion and a sealing portion in contact with one surface to be sealed, and an outer cage member having as integral parts a cylindrical peripheral portion adapted for fluid tight contact with the other surface to be sealed, a radially bent portion adjacent each of its edges, the radially bent portion on one edge having a generally axial portion extending inwardly toward the other radial portion, and a bent back portion formed at the inner extremity of said axial portion so that its full length lies axially beyond said inner extremity in the direction toward which it points and having its area divided into a plurality of spring fingers adapted to contact the sealing portion of said sealing member, and an extended portion on the other edge of said peripheral portion formed into a flange to clamp said sealing member against said bent back portion.

5. A unitary seal for closing the aperture between a housing and a shaft projecting therethrough, comprising a flexible sealing member having a clamping portion and a sealing portion in contact with one surface to be sealed, an outer cage member having as integral parts a cylindrical peripheral portion adapted for fluid tight contact with the other surface to be sealed, a radially bent portion adjacent each of its edges, the radially bent portion on one edge having a generally axial portion extending inwardly toward the other radial portion, and a bent back portion formed at the inner extremity of said axial portion so that its full length lies axially beyond said inner extremity in the direction toward which it points and having its area divided into a plurality of spring fingers adapted to contact the sealing portion of said sealing member, and a cage closure washer overlying the clamping portion of said sealing member and being clamped thereagainst by the radial portion on one edge of said cylindrical peripheral portion of the outer cage member.

6. A unitary fluid sealing device adapted to seal between two relatively moving substantially concentric surfaces comprising a flexible packing of sheet material having one end in engagement with one surface being sealed and the other end spaced therefrom to provide an axially extending clamping portion, and an integral cage and spring member formed from a stamping having a cylindrical portion with a peripheral surface for leak-tight fit with the other surface being sealed, an integral radially extending flange and an inturned flange-portion which three portions together form an axially extending channel in which the clamping portion of said sealing member is secured, an annular series of spring fingers carried by said cylindrical portion adjacent its other edge at an oblique angle thereto and extending laterally beyond the plane of attachment thereto on the side toward which they point.

FRED A. HELFRECHT.